UNITED STATES PATENT OFFICE.

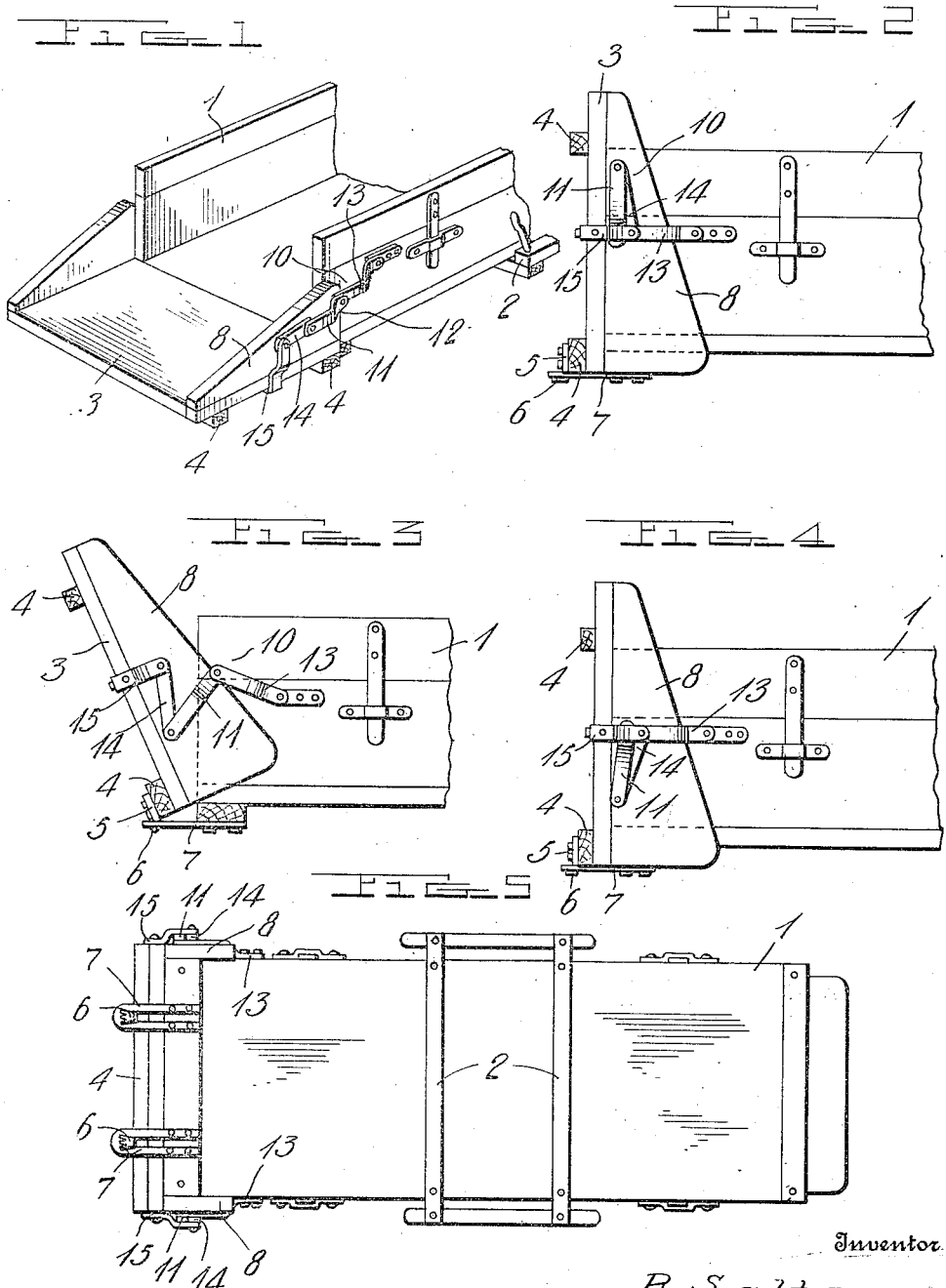

RALPH SALTZMAN, OF AVOCA, NEW YORK.

END-GATE.

1,058,266.

Specification of Letters Patent.

Patented Apr. 8, 1913.

Application filed August 8, 1912. Serial No. 714,053.

*To all whom it may concern:*

Be it known that I, RALPH SALTZMAN, a citizen of the United States, residing at Avoca, in the county of Steuben and State of New York, have invented certain new and useful Improvements in End-Gates; and I do declare the following to be a full, clear, and exact description of the invention, such as will enable others skilled in the art to which it appertains to make and use the same.

This invention relates to improvements in a detachable combined drop shoveling board and end gate for wagons.

The main object of the invention is to provide a detachable board of this class, which may be lowered to a horizontal position without wasting any of the contents of the wagon, and when shut forms a tight closure for the wagon box.

Another object is to provide an end gate having self locking hinges or supports.

With these and other objects in view, the invention consists of certain novel features of construction, combination and arrangement of parts, as will be hereinafter described and claimed.

In the accompanying drawings:—Figure 1 represents a perspective view of the rear portion of a wagon box with this improved shoveling board applied and in open position; Fig. 2 is a side elevation in closed position; Fig. 3 is an enlarged detail side elevation of one of the hangers or locking devices in partially open position; and Fig. 4 is a similar view, showing the locking device operable in a slightly different manner. Fig. 5 is a bottom plan view of the wagon box.

In the embodiment illustrated a wagon body 1 of ordinary construction is shown provided with the usual transverse cleats 2 on the lower face of its bottom. An end gate 3 embodying this invention is shown applied to the rear end of the wagon box or body 1 and is preferably constructed of wood with transverse strengthening cleats 4 on its outer face, one of said cleats being preferably arranged with its lower edge flush with the lower edge of the gate. L-shaped hangers or hinge members 5 are secured to this cleat at the lower edge of the gate, the long arms of said members being riveted or otherwise secured to the cleat and the short arms 6 thereof extend laterally outward and are made wider at their free ends being here shown slit for this purpose. The slit portions are spread laterally to widen the ends of the arms. Coöperating U-shaped members 7 which are first engaged with the hanger arms 6 have their free ends secured to the cleat at the end of the wagon box, and said members project longitudinally beyond the wagon box, the arms 6 of the hangers 5 being slidably engaged with the looped portions of the members 7. The legs of the members 7 are spaced apart substantially the same distance as the width of the short arms 6 at their narrower portions. The wider free ends of these arms 6 serve to prevent the hangers 5 from accidentally separating from the U-shaped members and hold them reliably connected. This end gate 3 is provided with side wings or cheeks 8, which preferably taper toward their upper ends and are secured to the side edges of the gate and extend at right angles thereto being spaced apart by the length of the gate which is sufficient to cause the cheeks to pass outside the side walls of the wagon box and closely embrace said walls. This gate 3 may be of any desired width sufficient to form a bridge or scoop of the desired length when let down into horizontal position.

Foldable jointed connections or side hangers 10 extensibly connect each side or wing of the end gate 3 with the side members of the wagon box, and when extended these jointed hangers hold the gate in horizontal position with its inner or lower edge abutting the rear end of the box bottom forming a tight joint between them. The inner end of said gate is held by the coöperating hinge members 5 and 7.

The jointed side hangers 10 each comprises a plurality of pivotally connected links, three being here shown. The intermediate link 11 of each hanger is longest and has an offset end 12 to form a stop for locking the links in folded position in a manner hereinafter described. The inner end link 13 has its inner end offset inward to adapt it to be secured to the wagon box and permit its outer end to pass over the cheek of the gate, as shown in Figs. 1 and 2. The outer end link 14 is pivoted at its inner end to the intermediate link 11 and at its outer end to one end of an arm 15, the other end of said arm being fixedly secured to the end gate 3 preferably at a point midway the width of said gate. This arm 15 is offset to space it from the cheek to which it is secured a distance sufficient to permit the inwardly offset end of the link 11 to pass between the lower face of said arm 15 and the adjacent cheek when the connection is in folded position, whereby the end gate is locked in closed position.

When the links of the connection 10 are in folded locking position, the intermediate link 11 and the inner link 14, in the form shown in Figs. 1 to 3, extend upwardly with the bulged portion of link 11 engaged with the upper edge of the arm 15 and the inner link 13 extended at right angles thereto—see Fig. 2. The links of the connection 10 may be also folded as shown in Fig. 4, to lock the gate in closed position, and when so folded the links 11 and 14 extend downwardly with the offset portion of link 11 engaged with the lower edge of the arm 15, said links 11 and 13 extending at an oblique angle to the link 13, which is arranged in a horizontal position parallel with the side of the wagon box to which it is secured. To unlock the connection 10, the folded links 11 and 14 when arranged as shown in Figs. 1 and 3 or in Fig. 4 are moved forward to disengage them from the arm 15 and a downward pull on the end gate will then cause the links to unfold into longitudinal alinement which permits the end gate to swing down into horizontal position forming an extension of the wagon box with the cheeks of the gate closely engaging the outer faces of the sides of the box. Hence, it will be obvious that the peculiarly arranged links 11, 13 and 14 and the arm 15 perform the double function of a support for the gate when in lowered position and of locking means for holding the gate in closed position.

The peculiar hinge connection for the bottom of the gate permits the gate to open down with its inner face flush with the inner face of the bottom of the wagon box, whereby the contents of the box may be readily shoveled out over the end gate as a smooth unobstructed surface is presented to the passage of the material being shoveled.

The intermediate link 11 is made longer than the outer link 14 so that when in folded locked position the end of link 11, which is pivoted to inner link 13 will project beyond the pivotal connection of said link 14 with the arm 15 and thereby securely lock the links in folded position, see Figs. 2 and 3.

Having thus described my invention, what I claim is:

1. The combination with a wagon box of an end gate having cheeks, said wagon box and end gate constituting members to be connected, side hangers connecting the sides of said box and the cheeks of said gate, each hanger comprising a plurality of pivotally connected foldable links, an arm fixed on one of the members to be connected and offset therefrom, said arm being pivotally connected with one of said links, one of the links having a stop to engage said arm and lock the hanger in folded position, another of said links being pivoted at one end to the other member to be connected, the pivoted end of said last mentioned link being offset inwardly to space the body of the link a sufficient distance from the face of the member to which it is connected to permit it to span the edge of the other member.

2. The combination with a wagon box, of an end gate having cheeks, said wagon box and end gates constituting members to be connected, side hangers connecting the sides of said wagon box and the cheeks of said gate, each hanger comprising a plurality of pivotally connected foldable links including two end links and an intermediate link, the intermediate link being longer than one of the end links, an arm fixed on one of the members to be connected and spaced therefrom, said arm being pivotally connected with the shorter end link and the other end being pivoted to the other member to be connected.

In testimony whereof I have hereunto set my hand in presence of two subscribing witnesses.

RALPH SALTZMAN.

Witnesses:
CHARLES S. RYNDERS,
BENNETT H. HIGGINS.